(12) United States Patent
Tilton et al.

(10) Patent No.: US 7,839,031 B2
(45) Date of Patent: *Nov. 23, 2010

(54) SPRAY COOLED MOTOR SYSTEM (75) Inventors: Charles L. Tilton, Colton, WA (US); George J. Wos, Colton, WA (US); Ryan J. Baddeley, Pullman, WA (US)

(73) Assignee: Parker Intangibles LLC, Cleveland, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/156,967

(22) Filed: Jun. 6, 2008

(65) Prior Publication Data

US 2008/0238223 A1 Oct. 2, 2008

Related U.S. Application Data (63) Continuation of application No. 10/991,003, filed on Sep. 25, 2003, now Pat. No. 7,397,154, which is a continuation of application No. 09/962,812, filed on Sep. 24, 2001, now abandoned.

(51) Int. Cl.
*H02K 9/20* (2006.01)

(52) U.S. Cl. .............................. 310/54; 310/53; 310/64
(58) Field of Classification Search .................. 310/52, 310/54, 57
See application file for complete search history.

(56) References Cited

U.S. PATENT DOCUMENTS

| | | | | | |
|---|---|---|---|---|---|
| 2,570,117 | A | * | 10/1951 | Hallstrand | 384/152 |
| 3,531,668 | A | * | 9/1970 | Cathey | 310/58 |
| 3,648,085 | A | * | 3/1972 | Fujii | 310/54 |
| 3,681,628 | A | * | 8/1972 | Krastchew | 310/54 |
| 4,075,522 | A | * | 2/1978 | Hoffman | 310/214 |
| 4,138,862 | A | * | 2/1979 | Muller | 62/508 |
| 4,198,191 | A | * | 4/1980 | Pierce | 417/369 |
| 4,611,137 | A | * | 9/1986 | Sutrina | 310/54 |
| 4,712,030 | A | | 12/1987 | Lakin et al. | 310/89 |
| 4,895,005 | A | * | 1/1990 | Norbeck et al. | 62/506 |
| 4,959,570 | A | * | 9/1990 | Nakamura et al. | 310/54 |
| 5,050,891 | A | * | 9/1991 | Ishikawa | 277/410 |
| 5,111,090 | A | * | 5/1992 | Otake et al. | 310/54 |
| 5,509,381 | A | * | 4/1996 | Fisher | 123/41.31 |
| 5,682,074 | A | * | 10/1997 | Di Pietro et al. | 310/215 |
| 6,091,174 | A | * | 7/2000 | Genster | 310/89 |
| 6,329,731 | B1 | * | 12/2001 | Arbanas et al. | 310/52 |
| 6,639,334 | B2 | * | 10/2003 | Chen et al. | 310/52 |

* cited by examiner

*Primary Examiner*—Burton Mullins
(74) *Attorney, Agent, or Firm*—Wells St. John PS (57) ABSTRACT

A spray cooled motor system with a motor housing with an interior and an exterior, a stator mounted within the interior of the motor housing, a rotor mounted within the interior of the motor housing, a coil winding mounted within the interior of the motor housing, a plurality of atomizers configured to spray a coolant on at least one of the stator and the rotor, a coolant pump in fluid communication with the plurality of atomizers; and an output shaft extending through an output shaft aperture from the interior to the exterior of the motor housing.

4 Claims, 9 Drawing Sheets

SPRAY COOLED MOTOR SYSTEM

CROSS REFERENCE TO RELATED APPLICATIONS

This application is a continuation of U.S. patent application Ser. No. 10/991,003, filed Sep. 25, 2003 now U.S. Pat. No. 7,397,154, and hereby incorporates it and each of the below referenced applications by reference; and which is a continuation of U.S. patent Ser. No. 09/962,812, filed Sep. 24, 2001; and abandoned, which claims the priority of, and incorporates by reference, U.S. provisional patent application Ser. No. 10/991,003, filed Sep. 25, 2003.

TECHNICAL FIELD

This invention generally pertains to a spray cooled motor system.

BACKGROUND OF THE INVENTION

While motors have been known for years, their performance has been limited by thermal constraints and their ability to remove heat from part or all of the motor. Improved thermal characteristics and/or enhanced motor operational characteristics may be achieved with internal spray cooling.

It is an object of this invention to provide a spray cooled electric motor system.

BRIEF DESCRIPTION OF THE DRAWINGS

Preferred embodiments of the invention are described below with reference to the following accompanying drawings.

FIG. 6 is a perspective view of another conceptual motor assembly contemplated by this invention;

DETAILED DESCRIPTION OF THE PREFERRED EMBODIMENTS

Many of the fastening, connection, manufacturing and other means and components utilized in this invention are widely known and used in the field of the invention described, and their exact nature or type is not necessary for an understanding and use of the invention by a person skilled in the art or science; therefore, they will not be discussed in significant detail. Furthermore, the various components shown or described herein for any specific application of this invention can be varied or altered as anticipated by this invention and the practice of a specific application or embodiment of any element may already be widely known or used in the art or by persons skilled in the art or science; therefore, each will not be discussed in significant detail.

The terms "a", "an", and "the" as used in the claims herein are used in conformance with long-standing claim drafting practice and not in a limiting way. Unless specifically set forth herein, the terms "a", "an", and "the" are not limited to one of such elements, but instead mean "at least one".

Contained in the Appendix hereto is a provisional application and disclosure, which is hereby incorporated herein by this reference as though set forth fully herein.

While there are several types of motors with which this invention may be used, some may be more preferred than others. One example of a preferred type of motor for this invention is a variable or switched reluctance motor "VSR" or "SRM". It will be appreciated by those of ordinary skill in the art that there are numerous different types of motors with which the spray coolant system may be utilized to provide enhanced thermal and other characteristics of the motor, with no one in particular being required to practice this invention. Examples of different types of motors are, without limitation, variable switched reluctance motors, induction motors, synchronous motors, DC (direct current) and AC (alternating current) commutator motors, reluctance motors, hysteresis motors, and others. Motors of all types and kinds are well known by those of ordinary skill in the art and will not therefore be discussed in significant detail herein.

While it is preferred that the motor electronic controls and spray system be entirely contained within or integrated within the motor housing, this is not necessary to practice this invention. This invention applies to spray cooling systems for motors in which some or all of the components may be outside the motor housing, such as the pump for instance.

Figure 1:
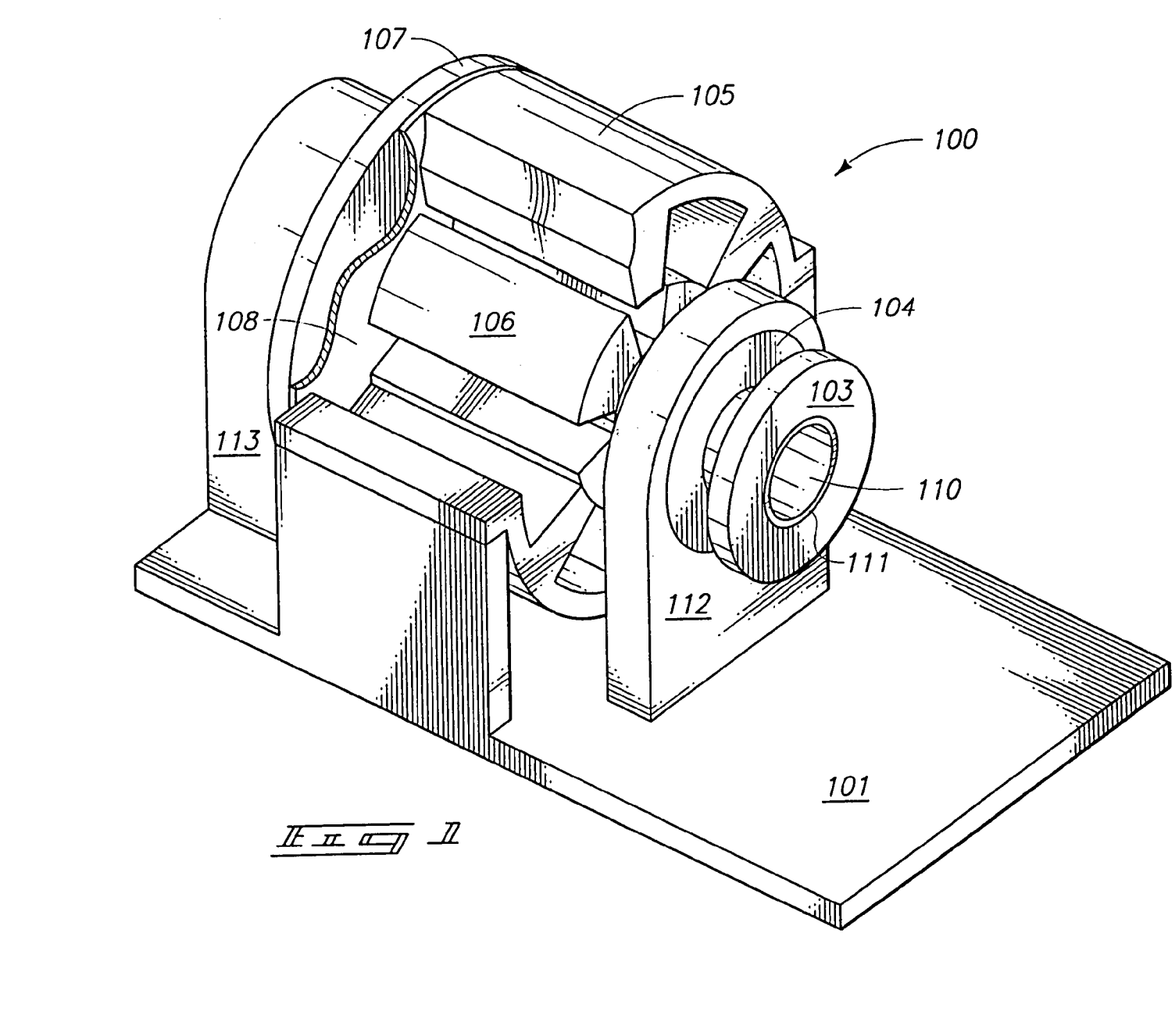
FIG. 1 is a perspective view of a conceptual motor which includes an embodiment of a spray cooling system contemplated by this invention.

FIG. 1 is a perspective view of a conceptual motor system 100 which includes a spray cooling system, FIG. 1 illustrating motor system 100, motor base 101, first support 112, second support 113, rotor 106, stator 105, output or shaft bearing 104, drive gear 103, output shaft aperture 110 and output shaft aperture seal 111. The output shaft aperture seal 111 may be any one of a number of types, including without limitation, sliding elastomeric seals, ferro-fluidic seals or any one of a number of others, all within the contemplation of this invention.

FIG. 1 illustrates a spray assembly 107 at a first end of motor assembly 100 with the output shaft aperture 110 being at the second end of the motor assembly. Although in the example illustrated in FIG. 1 the spray assembly 107 is located at a first end of the motor system 100 and opposite the output end of the motor system, it is not required to be in any particular location as will be appreciated by those of ordinary skill in the art. While not necessary to practice this invention, it is preferred that the spray nozzles be located at an end of the motor system.

There are different types of coolant atomizers which may be utilized in the practice of this invention and the invention is not limited to any one type or kind. The preferable atomizer is a pressure swirl atomizer such as that provided in U.S. Pat. No. 5,220,804, Inventor Tilton, issued Jun. 22, 1993, and U.S. Pat. No. 6,016,969, Inventor Tilton, issued Jan. 25, 2000, both of which are incorporated herein by this reference.

It is also preferred that the spray coolant be an evaporative spray coolant (preferably a dielectric) which disburses a thin liquid film over various pre-determined motor assembly or system components within the motor housing. The evaporative spray coolant may remove heat from said components during evaporation and other phases. The motor system also preferably provides, either inherently or mechanically, condensation capabilities to condense any evaporated or vaporized spray coolant for further spraying and cooling operations.

There are numerous types of coolants that may be utilized in embodiments of this invention, with no one in particular being required to practice this invention. For instance, a preferred coolant is a Fluorinert (R) type of coolant, such as FC72 or FC-82 fluid manufactured by and/or available through the 3M Company.

Figure 2:
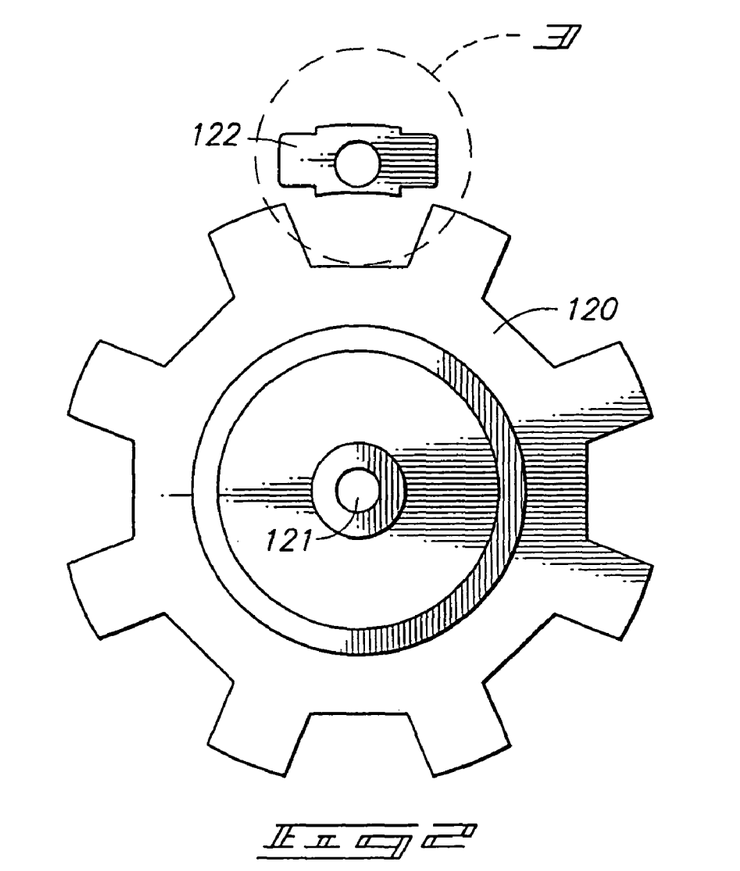
FIG. 2 is a conceptual cross-section of a rotor and one stator pole/winding which may be utilized in an embodiment of this invention.

FIG. 2 illustrates an exemplary or conceptual 8 pole rotor 120 which may rotate about rotor axis 121 and further illustrates stator pole/winding 122 positioned relative to the rotor.

Figure 3:
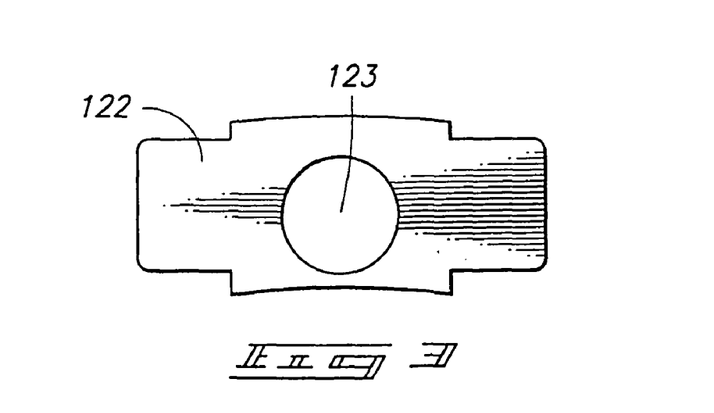
FIG. 3 is an enlarged view of the stator pole/winding illustrated in FIG. 2.

FIG. 3 is an end elevation view of detail 3 from FIG. 2, illustrating stator pole/winding 122. The aperture 123 in stator pole/winding 122 is not a normal component to the stator pole/winding 122 but instead may be utilized in testing to provide additional heat to further appraise the thermal transfer characteristics of a system during testing. There is no one particular type of stator 122 which must be utilized by any embodiment of this invention, as any one of the number of types of stators may be used in the practice of the invention.

Figure 4:
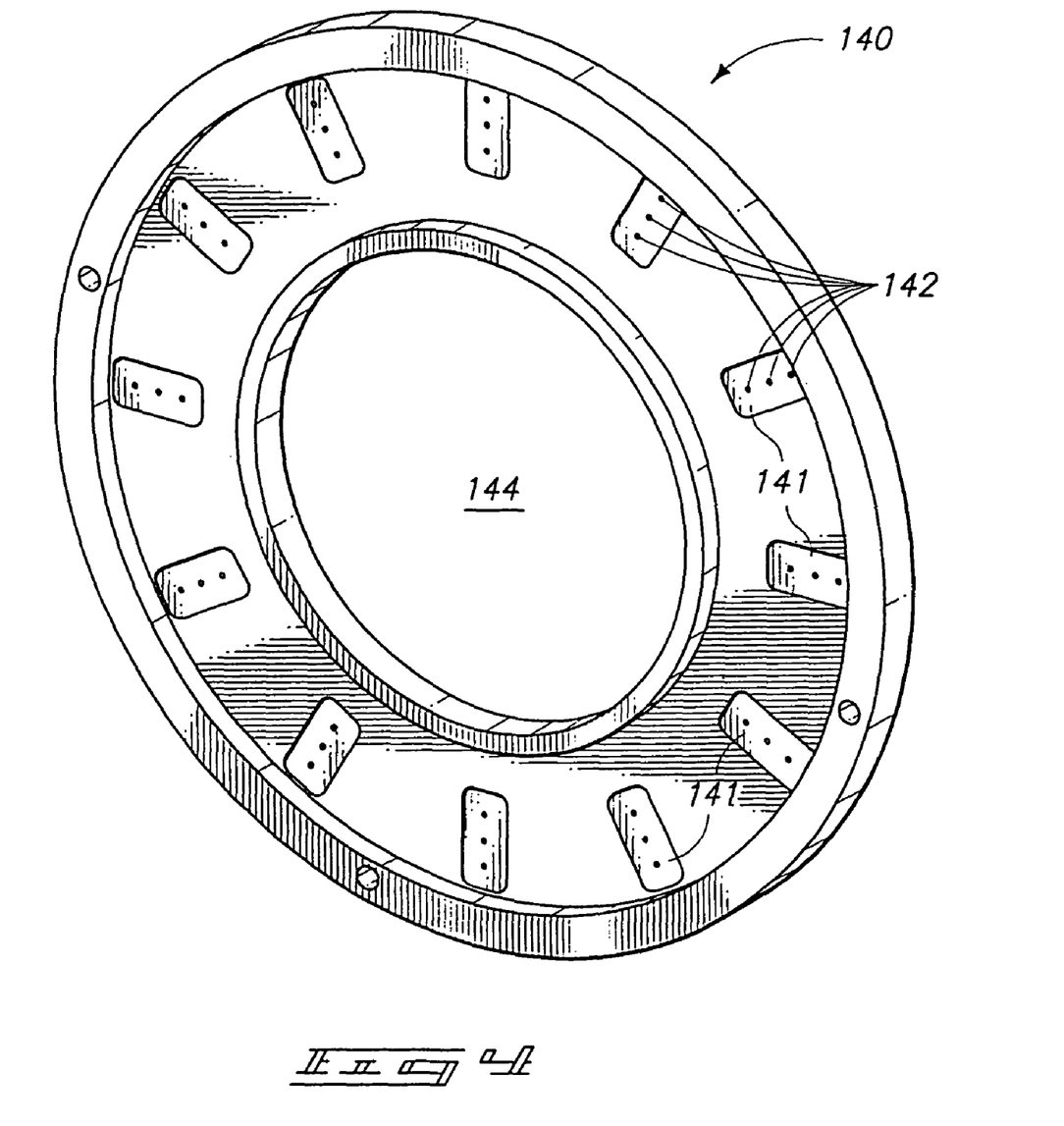
FIG. 4 is a perspective end view of a nozzle ring manifold which may be utilized in an embodiment of this invention, showing 12 sets of 3 nozzle orifices, which provides 3 spray orifices per winding gap.

FIG. 4 illustrates one embodiment of a spray assembly 140 which may be utilized in this invention, illustrating a plurality of nozzle areas 141 which would each include a plurality of nozzle apertures 142. Spray assembly aperture 144 allows for typical motor components to be placed there-through.

The spray assembly 140 may include, define and/or comprise a pressurized fluid intake and/or distribution manifold to receive a coolant from a pump assembly and through fluid communication with the nozzle apertures 142 provide the required coolant under pressure to the nozzle apertures 142 for spraying. While it is preferred to utilize a spray assembly 140 or spray manifold in this invention, it is not necessary as individual coolant conduits and widely placed spray nozzles may also be utilized. One of the other examples may be the fluid conduits illustrated in FIG. 11.

Figure 5:
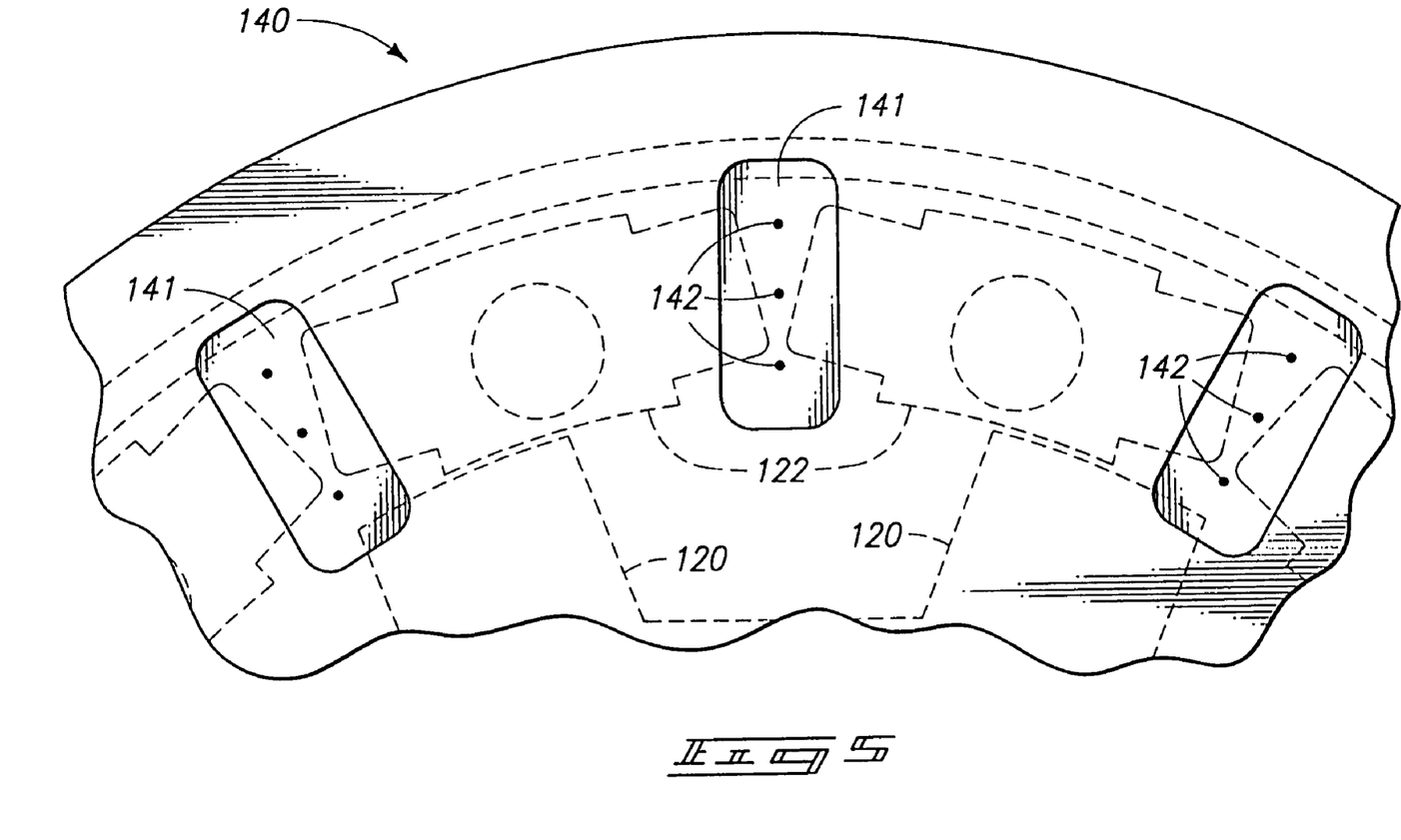
FIG. 5 is a partial view of the spray assembly and positioning of nozzle orifices relative to the stator pole/windings and rotor illustrated in FIG. 2.

FIG. 5 shows a partial schematic representation of one of the numerous orientations of the spray assembly 140 with nozzle areas 141 and nozzle apertures 142 relative to exemplary stator pole/windings 122 and rotor pole 120. The positioning of nozzle apertures 142 between stator poles 122 provides one example of an efficient atomization pattern for distribution of the coolant through the stator poles/windings 122. The positioning of the nozzle apertures 142 as shown in FIG. 5 also provides spray cooling to rotor 120 and the poles of rotor 120 through one or more of the nozzle apertures 142. In practice and various applications, certain nozzle apertures may be primarily directed to the stator and some may be primarily directed to the rotor, with still others being primarily directed to provide spray coolant to both the stator and the rotor. Again, no particular configuration is required to practice this invention.

FIG. 6 represents one exemplary embodiment of a motor assembly 160 which utilizes a spray coolant system. FIG. 6 illustrates motor assembly 160, motor housing 161, first support 162, second support 163, output shaft 164 rotatably mounted within first support 162, motor base 165, spray assembly 167 at the second end of motor assembly 160, the same end as the output shaft 164. Again, no particular motor assembly, configuration or components are required for motor cooling systems contemplated by this invention.

Figure 7:
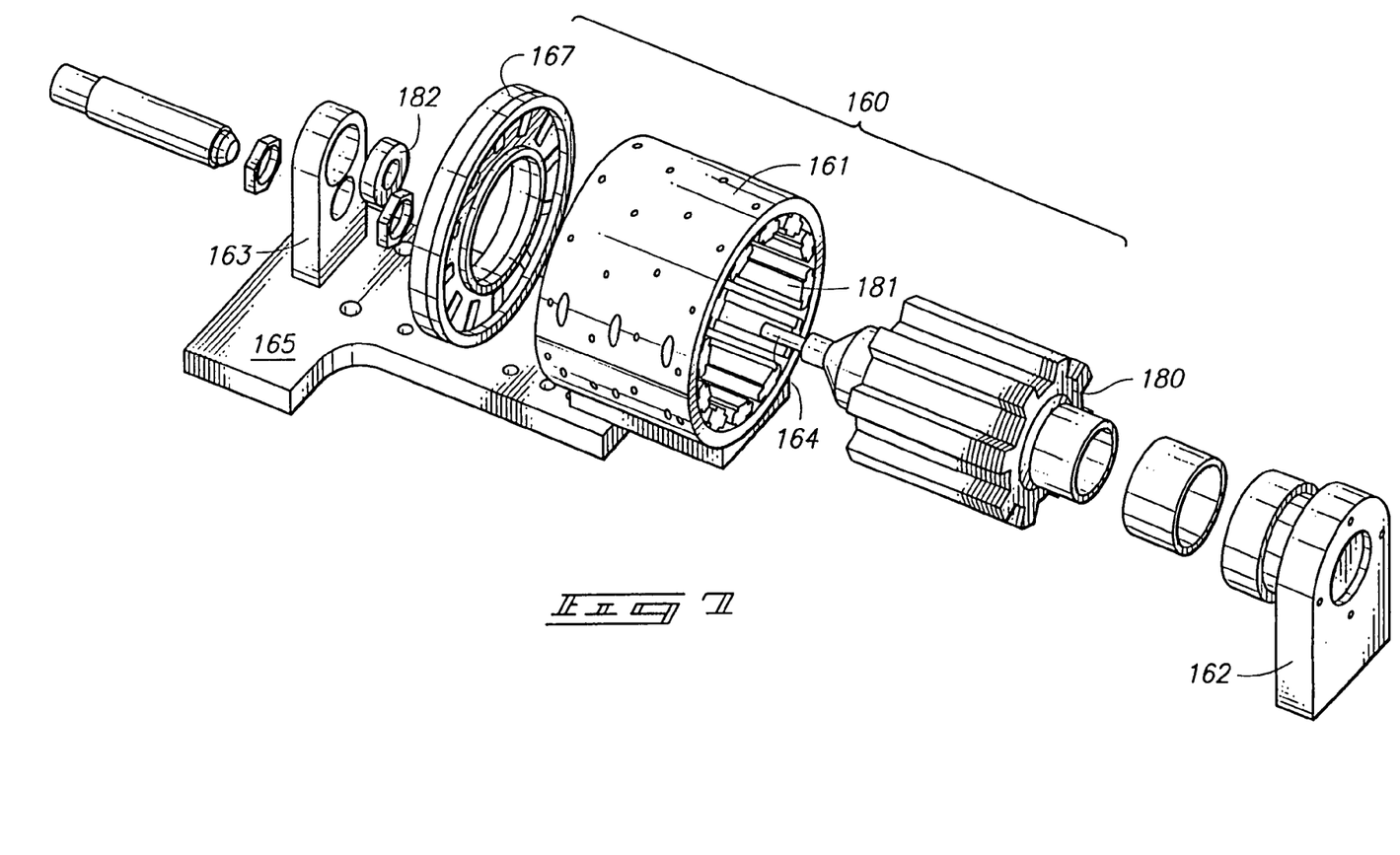
FIG. 7 is an exploded view of the conceptual motor assembly illustrated in FIG. 6.

FIG. 7 is a perspective exploded view of the motor assembly 160 shown in FIG. 6, illustrating rotor 180, first support 162, second support 163, spray assembly 167, stator 181, bearing 182, output shaft 164, and base 165. The rotor 180 is an 8-pole rotor, although not all rotor poles are shown in FIG. 7.

Figure 8:
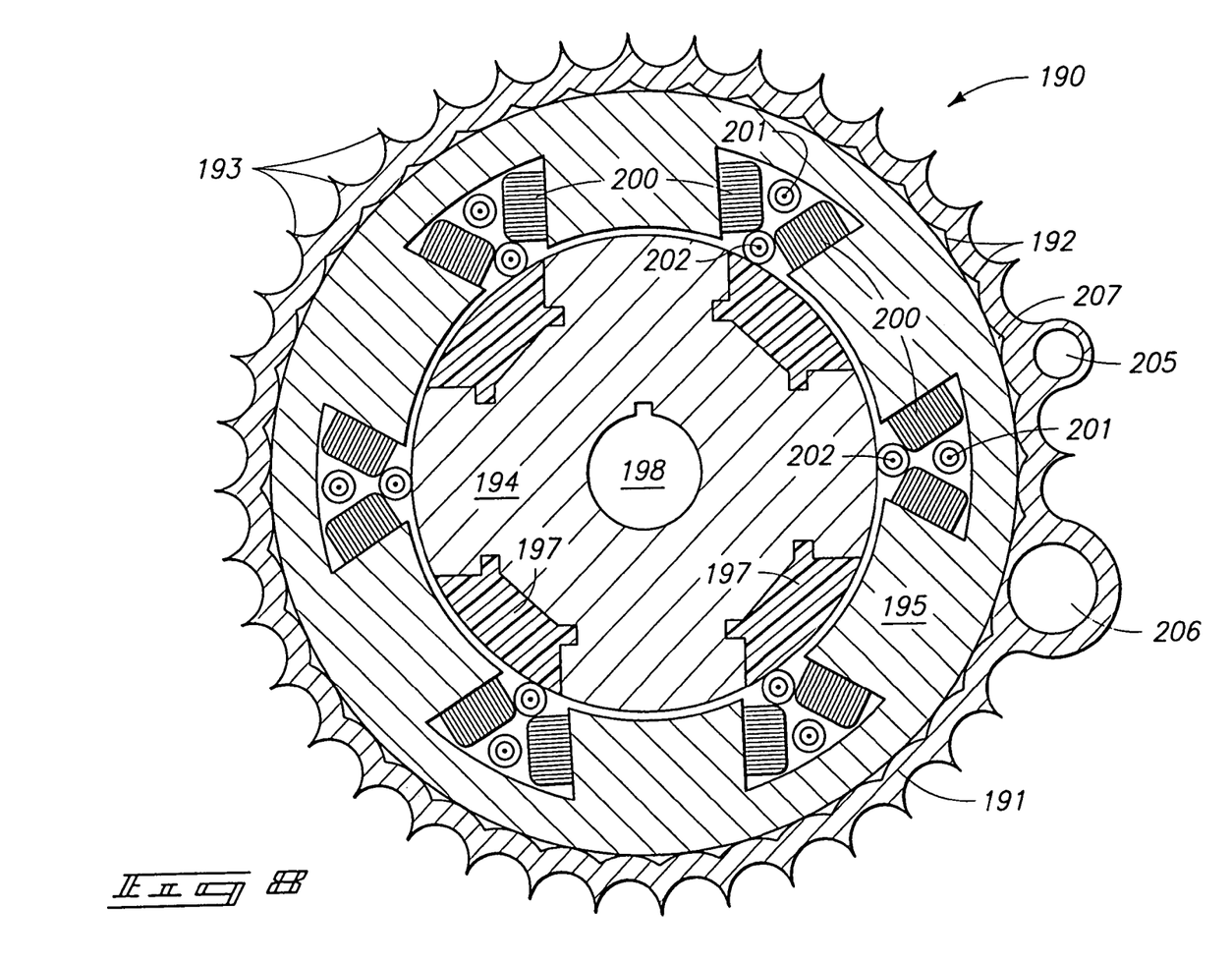
FIG. 8 is a cross-sectional view of another embodiment of a motor assembly with an embodiment of the spray cooling system contemplated by this invention.

FIG. 8 is an exemplary cross-sectional view of another embodiment of a motor system 190 contemplated by this invention, illustrating motor system 190, motor housing 191, condensing fins 192, cooling fins 193, stator windings 200 within stator 195, stator cooling atomizers or nozzles 201, rotor cooling atomizers or nozzles 202, rotor 194 with rotor filler 197 and output shaft aperture 198. It will be noted that although a cooling atomizer may be referred to herein as a stator or a rotor cooling nozzle, either may provide cooling to either or both of the stator and/or the rotor.

FIG. 8 is shown with a rotor 194 which includes spaced apart poles with a dielectric polymer filler 197 inserted between the spaced apart poles, thereby creating a continuous outer surface. The filler 197 need not be of any particular material and reduces the windage losses during the rotation of the rotor 194.

Although within motor housing 191, breather aperture 205 and receiver aperture 206 are shown but need not be within or integral with motor housing 191. The breather aperture 205 is provided because it is difficult to keep all air outside the system and air may be drawn into the motor housing, causing non-condensables to form as a result of the winding and electronic component out-gassing. If the non-condensables are allowed to accumulate, these gases may have a negative effect on the cooling system performance. Therefore, one or more breathers 205 may be provided, such as a molecular sieve, to assist in expelling the gases. The sieve for example may consist of a porous ceramic structure which is impervious to fluid coolant molecules but which allows smaller molecules such as air to pass freely therethrough.

A check valve may also be required to prevent air infiltration during low ambient conditions. Although an example of a breather is described herein, those of ordinary skill in the art will appreciate that no particular type of breather is required, but any one of a number of different types of materials and systems may be utilized to, among other functions, help remove or minimize non-condensables within the motor housing system.

The receiver 206 shown may be provided to buffer the effects of the widely varying operating conditions, in addition to providing liquid volume to compensate for leakages in the motor cooling system. A receiver volume may be a lengthwise cylinder contained as an integral part of the motor casing and may be actively controlled to prevent its discharge during off periods or low ambient conditions, as well as to provide cooling assistance to start-up electronics.

While a condenser may preferably be utilized by embodiments of the motor cooling system contemplated by this invention, it is not required to practice this invention.

The condenser may be designed to trap liquid at the pump section during off periods to avoid thermally stressing the electronics upon startup. Vapor bypassing is preferably prevented during all phases of operation, including the absence of gravity, under inverted positions and under transient conditions, as may be required by some applications of this invention. While it is preferable that the condenser be an integral part of the motor system and/or motor housing, this configuration is not necessary to practice this invention.

A shaft seal is also provided and is important to the viability of liquid cooled motors in most applications. It will be important to hold leakage of the fluid coolant to a minimum and oftentimes shaft seals are subject to the particular pressure imposed within the motor housing. Sliding elastomeric, ferro-fluidic and other types of seals may be utilized within the contemplation of this invention.

The condensing fins 193 provide surface area for cooling of atomized or vaporized coolant in the condensing channels 192 which may be in the motor housing, and should improve the overall performance of the motor cooling system. A coolant such as that manufactured by the 3-M Company referred to as Fluid FC-87 is an ozone safe dielectric perfluorocarbon which works well in some embodiments of this invention. A thin liquid film evaporation of spray coolant appears to be relatively efficient way of cooling electric motors, and amenable to the small gaps that exist between components of typical electric motors.

Only a small temperature rise may be required in order to vaporize and/or evaporate and condense the coolant with a minimum quantity of liquid present in the motor, according to the coolant used and the temperature at which it operates. Minimizing the liquid quantity of coolant (compared to full immersion of the interior of the motor housing) reduces pumping power requirements, the viscous losses and the potential for hydraulic damage. This invention is designed to deliver only sufficient coolant to maintain a thin film on the cooled surfaces with a minimum of carryover, it is preferred not to wholly fill the motor housing with coolant. The preferred coolant liquid film to be placed on internal components may be much thinner than the stator-to-rotor gap and the clearances between adjacent stator windings, which allows better distribution of the coolant throughout the components to be cooled.

Figure 10:
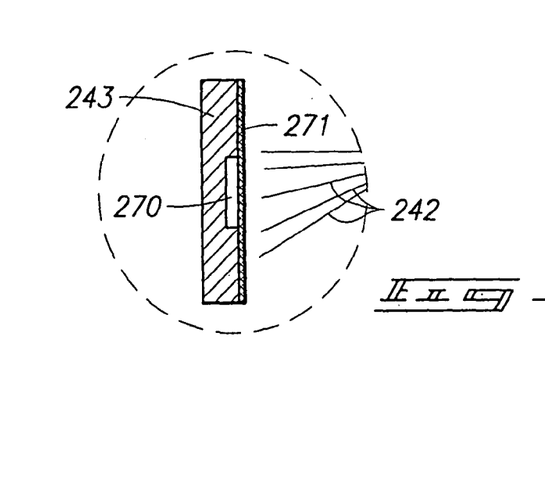
FIG. 10 is detail a-a from FIG. 9 illustrating a segmented electronics assembly encapsulated within the motor system.
Figure 11:
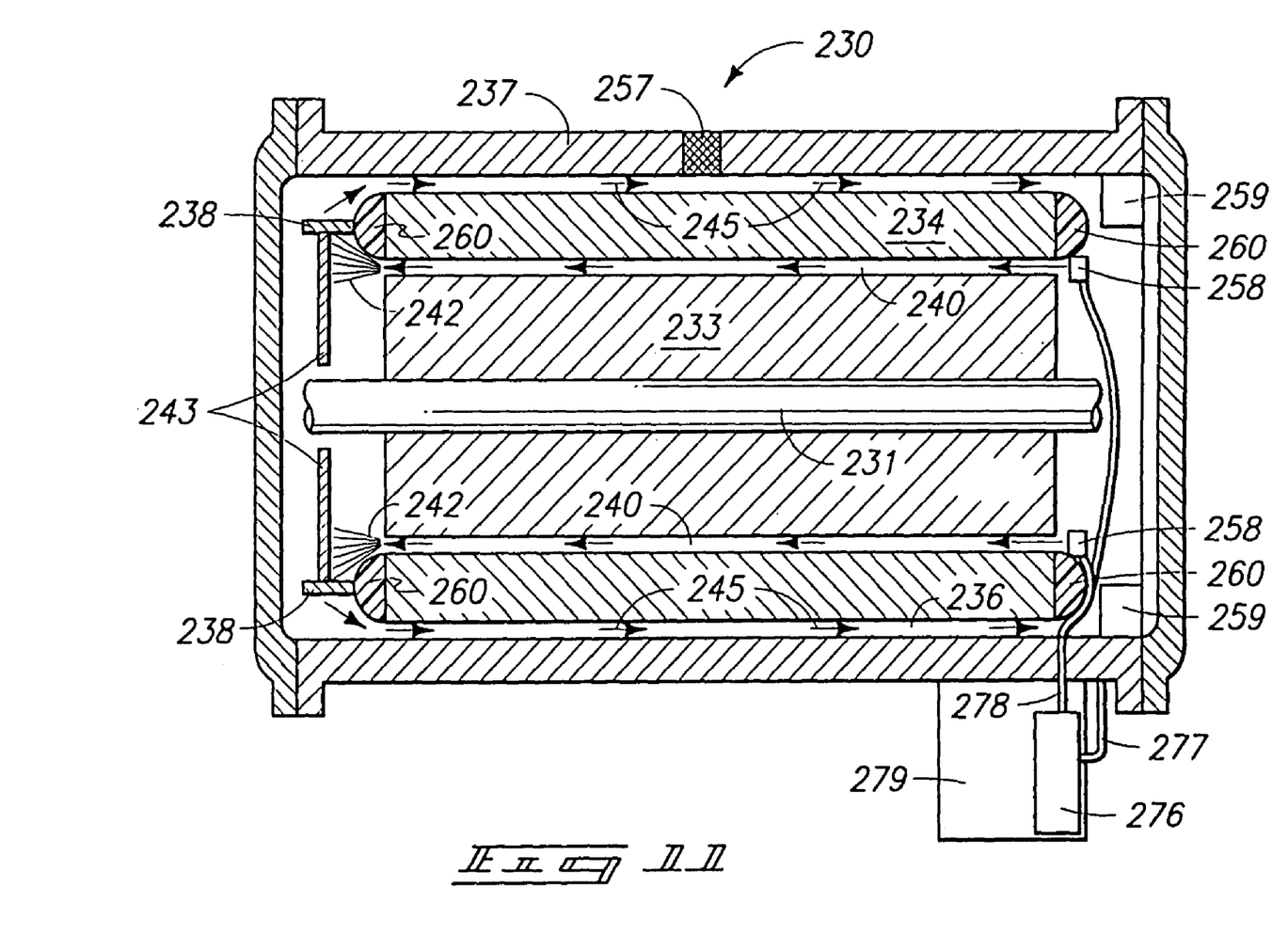
FIG. 11 is a cross-sectional schematic view of an embodiment of a motor with a spray cooling system contemplated by this invention, wherein the pump is retained external to traditional motor housing.
Figure 15:
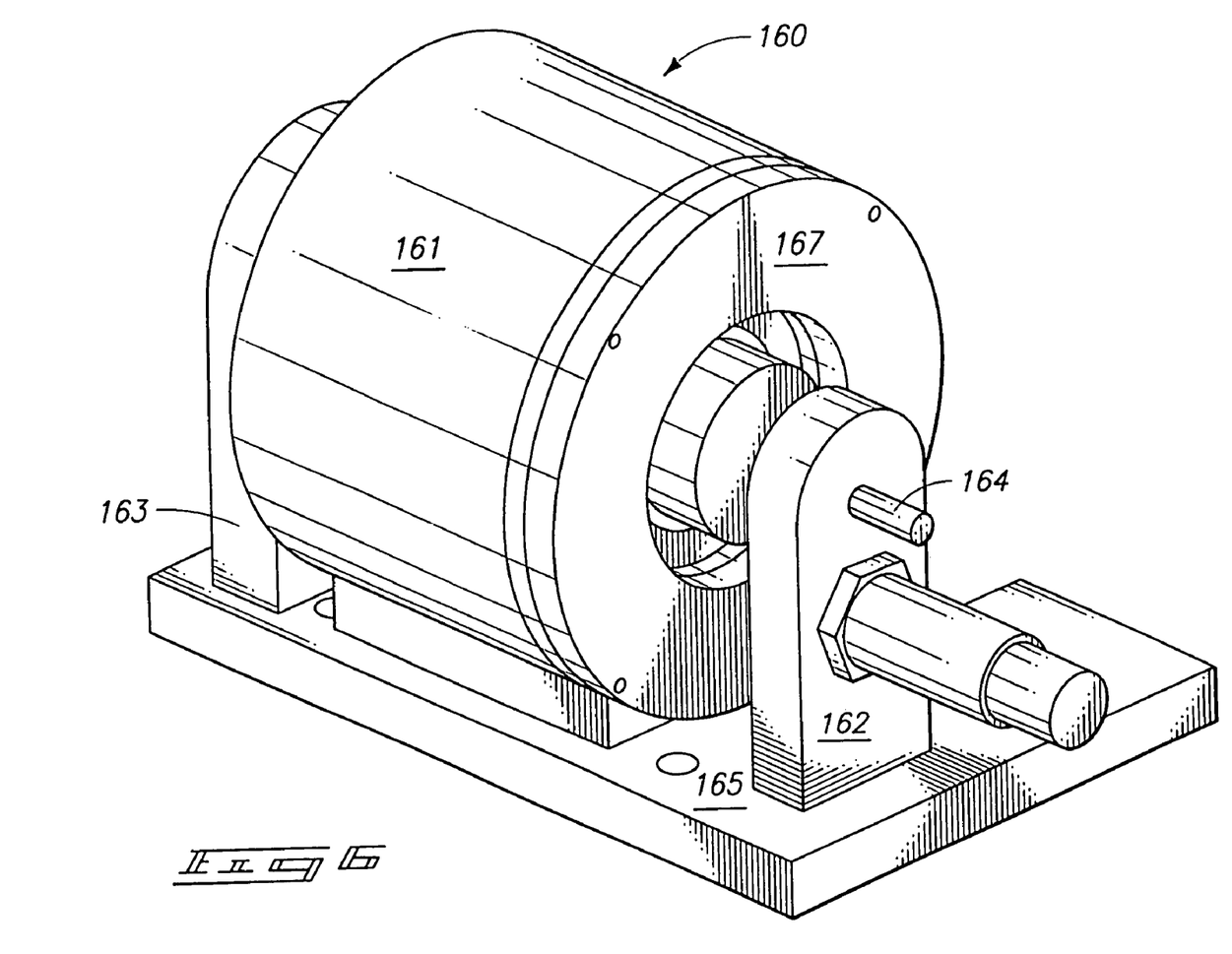

Another aspect which may be utilized in some embodiments of this invention is to apply the spray cooling to motor electronics or motor controls which may be located within the sealed motor housing or case (as illustrated in FIGS. 10 and 11). This may effectively reduce the size and weight of the motor controls and electronics assemblies required therefor, just as the spray cooling and thermal effects thereof may allow for the reduced size of motors.

It is preferable to utilize miniature pressure-swirl atomizers to atomize the coolant and spray it on the internal motor components to be cooled. This system, in providing electronics, the motor electronics, or control within the integrated motor housing, may also utilize over-spray and coolant vapor to cool the motor controls, although atomizers and nozzle orifices may be provided and directed toward the motor controls also, depending on the application or embodiment of this invention.

The motor control electronics may partially or entirely cooled by liquid carryover in entrained droplets which may be transported to the condenser region by the vapor within the motor housing.

Condensation channels may be provided within the motor case as longitudinal grooves on the interior radius or interior surface of the motor housing, forming closed channels within the stator in place, forming closed channels with the stator. Vapor and liquid exiting the stator and rotor cavities immediately enter the condensation channels which are in fluid or operative communication with the motor cavity at the exit end only. At the opposite end, the channels terminate directly into the fluid pump suction manifold which is utilized to continuously provide fluid to the atomizers.

The low pressure receiver 206 in the motor housing illustrated in FIG. 8 may have one or more of the following 3 functions: (a) providing makeup and recharge capability for any leakages in the system; (b) controlling system pressure; and (c) assisting during start-up by reducing or eliminating a delay in the delivery of coolant.

FIG. 8 further illustrates condensing channels 207 through which coolant of all phases may flow to provide a condensing function before the coolant is provided to the coolant pump (not shown in FIG. 8).

Figure 9:
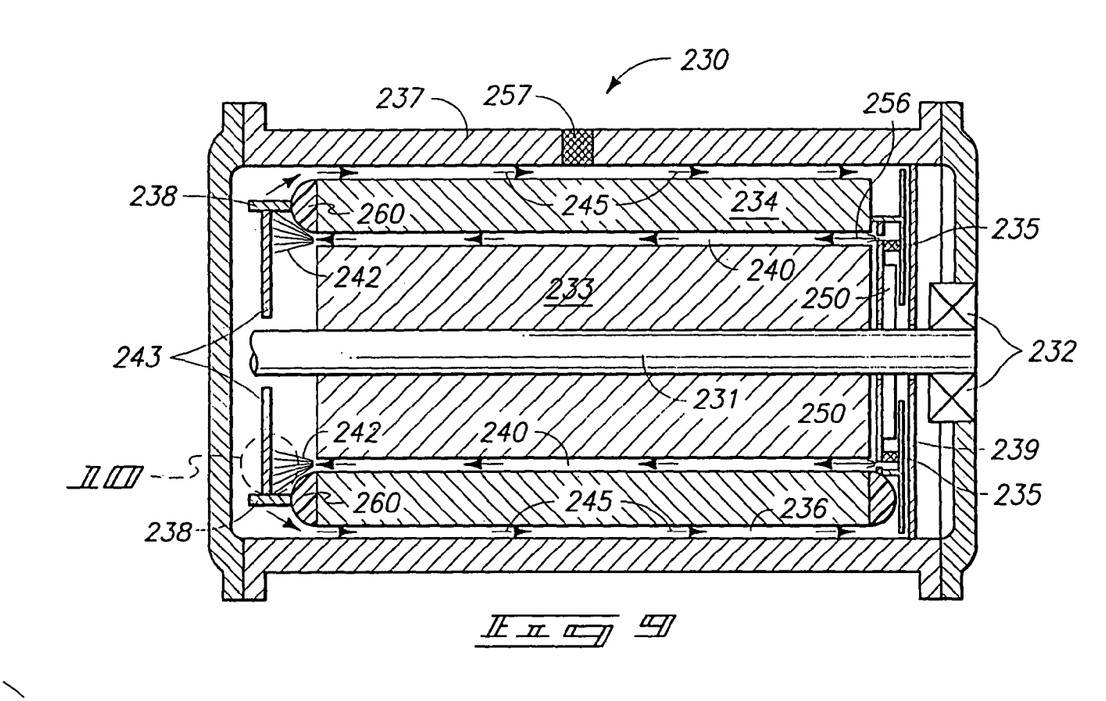
FIG. 9 is a cross-sectional schematic view of an embodiment of a motor with a spray cooling system contemplated by this invention.

FIG. 9 is a schematic representation of a cooling system configuration contemplated by an embodiment of this invention, illustrating motor assembly 230, output shaft 231, output shaft bearings 232, motor housing 237, stator 234 and rotor 233. FIG. 9 further illustrates condensing channel 236 which is the same as condensing channel 207 in FIG. 8, and the flow of fluid there-through as depicted by arrows 245.

Coolant filter 235 provides filtering to the coolant being sprayed on the interim components and cooling channel 240 provides return flow. The coolant spray 242 may be 2-phase flow leaving the gap and/or cooling channel/conduit 240 through which the coolant is circulated for cooling. The spray 242 may be directed toward segmented electronics assemblies 243 to provide an integrated electronics package, which includes spray cooling of the electronics, within the integrated motor housing.

Segmented electronics assemblies 243 are shown and detail 10 is shown in FIG. 10, which is described more fully below. Coolant pump 250 is illustrated with suction manifold 239 through which fluid is communicated, received and communicated to the coolant pump 250. The coolant received in suction manifold 239 may be received for instance from condensing channel 236 through apertures there-between. Coolants being atomized for cooling of the rotor and/or stator may pass through a coolant filter such as coolant filter 235. FIG. 9 further illustrates end windings 260 to stator 234 and terminations 238.

The depiction of item 243 may also include power switching controls to control and accomplish the switching of the electricity through the motor, all of which is well known in the art. An embodiment of this invention includes spray cooling the power switching controls within the motor housing.

FIG. 10 illustrates detail 10 from FIG. 9 and shows the segmented electronics assembly receiving 2-phase flow which would be provided through cooling channel 240 (as shown in FIG. 9). The motor controls or power device 270 is encapsulated within electronics assembly 243 with an EMI shield/power insertion/hermetic barrier 271 provided.

FIG. 11 is a cross-sectional schematic view of an embodiment of a motor with a spray cooling system contemplated by this invention, wherein the pump is retained external to traditional motor housing. FIG. 11 illustrates many of the same items or components as shown in FIG. 10, which have been similarly numbered, and which will therefore not be repeated here. FIG. 11 does further illustrate pump 276 external to motor housing 237, pump enclosure 279, pump outlet conduit 278, atomizer or nozzle assemblies 258 (may also be referred to as spray headers) and pump suction or inlet conduit 277.

This invention may also be practiced with some components such as the coolant pump 276 being mounted external to the motor housing 237. Suction header 259 (which is preferably in a ring configuration) is also shown.

Spray cooled motor systems as disclosed herein may be utilized in most or all applications in which motors are desired and/or used, including without limitation, electric vehicles, industrial uses of motors, aircraft, and others.

As will be appreciated by those of reasonable skill in the art, there are numerous embodiments to this invention, and variations of elements and components which may be used, all within the scope of this invention.

One embodiment of this invention for example is a spray cooled motor with a motor housing with an interior and an exterior, a stator mounted within the interior of the motor housing, a rotor mounted within the interior of the motor housing, a coil winding mounted within the interior of the motor housing, a plurality of atomizers configured to spray a coolant on at least one of the stator and the rotor, a coolant pump in fluid communication with the plurality of atomizers; and an output shaft extending through an output shaft aperture from the interior to the exterior of the motor housing.

Further embodiments of the above may be: wherein the motor is a variable switched reluctance motor; wherein the output shaft aperture is sealed with the motor housing such that the coolant is contained within the interior of the motor housing; wherein the output shaft aperture is sealed with the motor housing with a sliding elastomeric seal; and/or wherein the output shaft aperture is sealed with the motor housing with a ferro-fluidic seal; wherein the coolant pump is mounted within the motor housing.

In another embodiment, a spray cooled motor as recited above is provided, but which additionally may include heat transfer fins on the exterior of the motor housing, and/or a condensation conduit adjacent the motor housing such that vaporized coolant passing through the condensation conduit is condensed.

Still further embodiments of the above may be a spray cooled motor as recited above, and further including: motor controls mounted within the motor housing; and a plurality of control atomizers configured to spray coolant on the motor controls.

A still further embodiment of this invention is an electric motor vehicle with at least one spray cooled motor system contained thereon.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

I/We claim:

1. A spray cooled motor utilizing evaporative thin film spray cooling comprising:
    a motor housing with an interior and an exterior, and an output shaft aperture therein;
    a stator mounted within the interior of the motor housing;
    a rotor mounted within the interior of the motor housing;
    an output shaft operatively attached to rotate with the rotor and which extends into the output shaft aperture in the motor housing;
    a coil winding mounted within the interior of the motor housing;
    a plurality of atomizers configured to spray and distribute a liquid phase coolant on at least one of the stator and the rotor, said plurality of atomizers being configured to impart sufficient coolant on at least one of the stator and the rotor to provide and substantially maintain an evaporative spray thin film coolant layer;
    a coolant pump in fluid communication with the plurality of atomizers;
    a condensing return channel configured to received sprayed liquid and gaseous coolant and return the coolant for pumping by the coolant pump;
    a coolant filter disposed to receive and filter coolant from the condensing return channel and allow filtered passage of the coolant; and
    further wherein the coolant pump is mounted external to the motor housing.

2. A spray cooled motor utilizing evaporative thin film spray cooling as recited in claim 1, and further comprising:
    motor controls mounted within the interior of the motor housing and configured to control operation of the motor;
    a plurality of control atomizers configured to spray and distribute coolant on the motor controls; and
    wherein the motor controls are power switching controls.

3. A spray cooled motor utilizing evaporative thin film spray cooling as recited in claim 1, and further wherein the output shaft is configured for operative attachment to drive an automobile.

4. A spray cooled motor utilizing evaporative thin film spray cooling comprising:
    a motor housing with an interior and an exterior, and an output shaft aperture therein;
    a stator mounted within the interior of the motor housing;
    a rotor mounted within the interior of the motor housing;
    an output shaft operatively attached to rotate with the rotor and which extends into the output shaft aperture in the motor housing;
    a coil winding mounted within the interior of the motor housing;
    a plurality of atomizers configured to spray and distribute a liquid phase coolant on at least one of the stator and the rotor, said plurality of atomizers being configured to impart sufficient coolant on at least one of the stator and the rotor to provide and substantially maintain an evaporative spray thin film coolant layer; and
    a coolant pump in fluid communication with the plurality of atomizers;
    motor power switching controls;
    a plurality of control atomizers configured to spray coolant on the motor power switching controls; and
    wherein the motor power switching controls are mounted within the interior of the motor housing, and the output shaft is configured for operative attachment to drive an automobile.

* * * * *